US 8,246,818 B2

(12) United States Patent
Korzeniowski

(10) Patent No.: US 8,246,818 B2
(45) Date of Patent: Aug. 21, 2012

(54) SYPHON FILTRATION SYSTEM

(76) Inventor: Jan A. Korzeniowski, Calgary (CA)

( * ) Notice: Subject to any disclaimer, the term of this patent is extended or adjusted under 35 U.S.C. 154(b) by 494 days.

(21) Appl. No.: 12/429,993

(22) Filed: Apr. 24, 2009

(65) Prior Publication Data

US 2010/0270218 A1 Oct. 28, 2010

(51) Int. Cl.
*B01D 24/46* (2006.01)
(52) U.S. Cl. .......... 210/86; 137/140; 137/143; 210/108; 210/120; 210/134; 210/275; 210/277; 210/279
(58) Field of Classification Search .............. 210/86, 210/90, 103, 104, 108, 120, 258, 264, 275–279, 210/290–293, 792, 793, 136, 268, 284, 794, 210/795, 134; 137/123, 140, 143
See application file for complete search history.

(56) References Cited

U.S. PATENT DOCUMENTS

| | | | | |
|---|---|---|---|---|
| 1,570,523 A * | 1/1926 | Pennell | | 210/291 |
| 1,743,026 A * | 1/1930 | Daniels | | 210/251 |
| 2,053,628 A * | 9/1936 | Paterson | | 210/793 |
| 2,352,901 A * | 7/1944 | Klein | | 210/120 |
| 3,134,735 A * | 5/1964 | Greenleaf, Jr. | | 210/264 |
| 3,312,348 A * | 4/1967 | Greenleaf, Jr. | | 210/264 |
| 3,366,241 A * | 1/1968 | McMorris | | 210/96.1 |
| 3,680,701 A * | 8/1972 | Holca | | 210/790 |
| 3,757,954 A * | 9/1973 | Toth | | 210/277 |
| 4,537,687 A * | 8/1985 | Piper | | 210/793 |
| 4,818,420 A * | 4/1989 | Mims | | 210/798 |
| 5,137,645 A * | 8/1992 | Miller | | 210/793 |
| 5,449,453 A * | 9/1995 | Tang | | 210/108 |
| 6,638,422 B1 * | 10/2003 | Schwartzkopf | | 210/108 |
| 7,160,441 B2 * | 1/2007 | Gannon et al. | | 210/134 |
| 7,204,930 B2 * | 4/2007 | Nightingale | | 210/741 |
| 7,270,745 B2 * | 9/2007 | Schwartzkopf | | 210/108 |

* cited by examiner

*Primary Examiner* — Joseph Drodge

(57) ABSTRACT

A syphon filtration system is a low head, small foot print, long operating cycle, gravity filtration system for treatment of water and wastewater, with one-stage or two-stage filtration in one vessel with different filtration media of sand, anthracite, granular activated carbon or other proprietary filtration media. The one-stage filtration system removes suspended solids or dissolved impurities and the two-stage filtration system removes suspended solids and dissolved impurities. In the two-stage filtration system, each filtration stage can be backwashed independently or both stages can be backwashed simultaneously. Novel syphon piping and controls design extend the filtration operating cycle and reduce the filter apparatus headroom, and the filter backwash water volume requirements.

19 Claims, 2 Drawing Sheets

SYPHON FILTRATION SYSTEM

FIELD OF THE INVENTION

The invention is an apparatus and process for treatment of water and wastewater for removal of suspended solids and dissolved impurities.

BACKGROUND OF THE INVENTION

Filtration systems are used for treatment of water and wastewater for removal of suspended and/or dissolved impurities.

The filtration systems are usually one-stage, gravity or pressure flow systems. Filters can operate in a horizontal or vertical flow pattern: however, the vertical flow pattern is predominant. In the vertical flow pattern the liquid flow through the filter can be downward or upward during the production cycle and the filter backwashing is usually with upward liquid flow, however a combination of upward and downward liquid flow is also possible. Single or multiple filters can be used and multiple filters can be operated in series or in parallel arrangements. Filters can use filtration media with specific gravity higher or lower than the specific gravity of the liquid filtered.

The gravity flow filtration systems depend on a static water pressure (head) above the filter media for the water to flow through the media. The available static water pressure above the filter media is directly proportional to the filter vessel height above the filter media. Therefore, the higher the filter vessel above the filter media the longer the operating cycle is expected for the same water quality and flow rate treated.

The filtration systems are usually provided for removal of suspended solids or dissolved impurities and each usually requires an independent filtration apparatus.

If two stage suspended and/or dissolved solids filtration system is required, two independent filtration apparatus, operating in series are used.

Similarly, if suspended solids filtration and dissolved impurities filtration processes are required two independent filtration apparatus, operating in series are used.

Filter media need to be backwashed and preferably rinsed after they are plugged with the impurities which they remove. Each filtration apparatus is backwashed and preferably rinsed independently. The backwash and rinse water is predominantly wasted. The rinse water is predominantly the same as the backwash water and the rinse cycle follows the backwash cycle, although, the backwash water flow rate can be different or the same as the rinse water flow rate.

The invention offers several advantages over the conventional filtration systems as follows:

The novel syphon piping and control system, used in this invention, allows for reduction of the filter headroom requirements and it extends the filter operating cycle between the filter backwashings.

The novel syphon piping and control system design prevents the filter media from being exposed and disturbed on the surface during the filtration process.

The novel piping and control system design uses simple open/close automatic control valves to control the water level above the filter media and to perform the production, backwashing and rinsing processes, and minimizes the number of the control valves needed to perform all the processes.

The two-stage filtration system in one vertical apparatus reduces the foot print requirements and permits use of the same or different filtration media in each stage of the filtration apparatus.

The two-stage filtration system permits independent and simultaneous backwashing and rinsing of the filter media in both stages of the filtration system which reduces the backwash water and time requirements.

The two-stage filtration system in one apparatus requires less extensive controls and reduces the costs of the treatment system.

BRIEF SUMMARY OF THE INVENTION

The filtration system of the present invention is a process and apparatus for treatment of water and wastewater for removal of suspended solids and dissolved impurities.

The filtration system as shown on FIG. 1 uses a novel siphon piping and control system design which results in a lower head room requirements, an extended filtration cycle, a less frequent backwashing, a lower backwash wastewater volume and a lower filtration down time.

The two-stage filtration system in one apparatus, as shown on FIG. 2, results in a smaller footprint requirement and it lends itself to performing two different filtration processes such as a roughing and polishing filtration for removal of suspended solids, and a filtration process for removal of suspended solids and an adsorption filtration for removal of dissolved impurities in one apparatus.

The two-stage filtration system uses the one-stage syphon piping and control system design.

The two-stage filtration system backwashing of the filtration media can be done separately for each stage or jointly for both stages which results in a reduction of the backwash water volume requirements.

The filtration system comprises:

A vessel of steel, plastic, concrete or wood construction, vertical and preferably round, square or rectangular in cross section, approximately two to four meters in height. Open or close on the top, non-pressure vessel, one continuous vertical vessel for the one-stage filtration process and divided approximately in the middle of its height, with a solid horizontal plate (floor), for the two-stage filtration process.

Filtration media of sand, anthracite, activated carbon or other proprietary adsorption or non-adsorption type media.

Piping and control valves with a syphon arrangement.

A water level sensor and controller for activation of the syphon piping and the first-stage filtration media backwashing.

A deferential pressure control gauge for activation of the second stage filtration media backwashing.

A main controller for control of the operation of the piping syphon action and operation of the control valves, and the first and the second stage filter backwashing and rinsing processes.

Both, the one-stage and two-stage filtration systems operation can be fully automated with a PLC control system.

BRIEF DESCRIPTION OF THE SEVERAL VIEWS OF THE DRAWING

Having thus generally described the invention, it will be referred to more specifically by reference to accompanying drawings illustrating preferred embodiments, and in which.

DETAILED DESCRIPTION OF THE INVENTION

Figure 1:
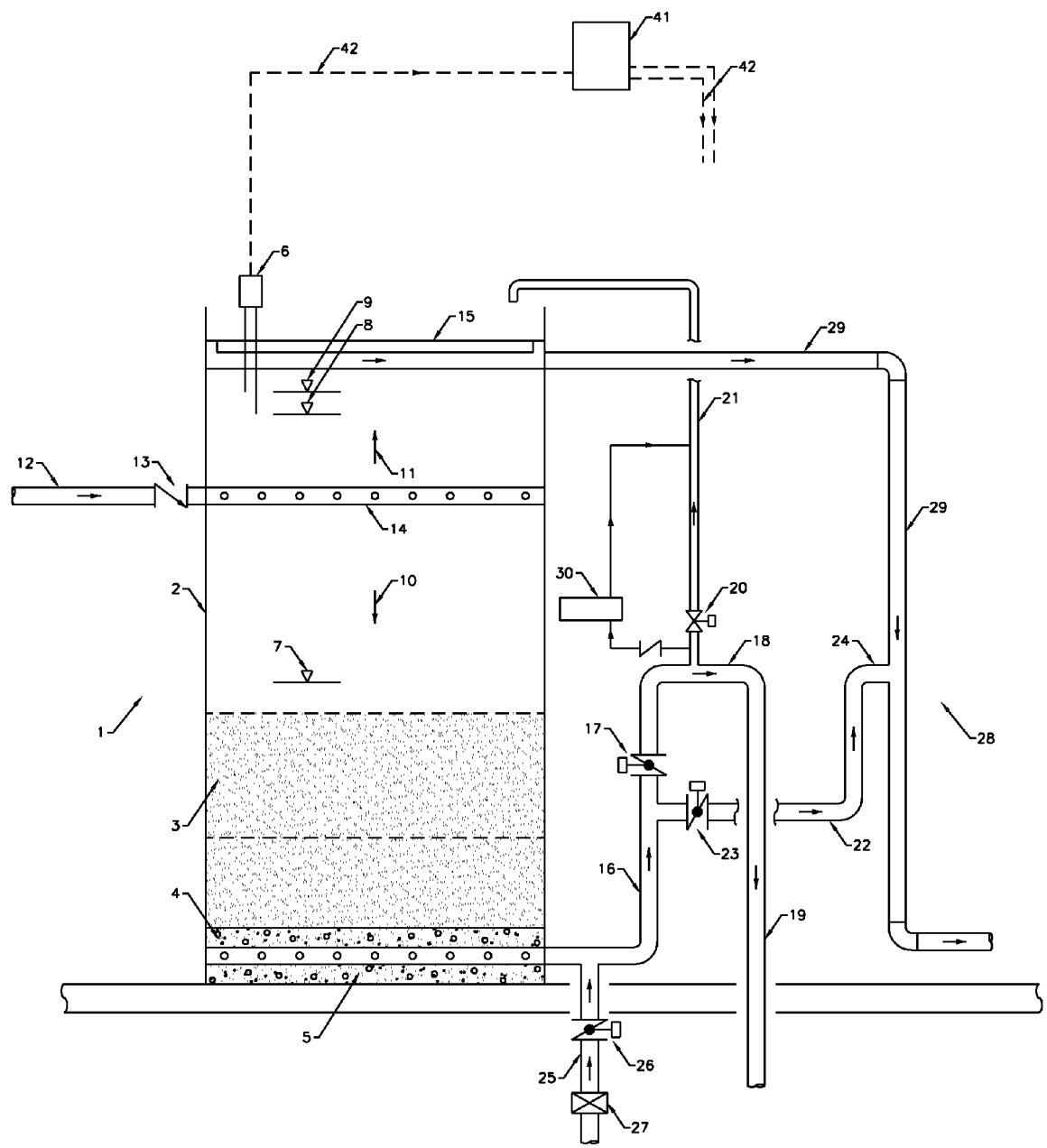
FIG. 1 is a diagrammatic illustration in vertical cross-section of the one-stage syphon filtration system.

According of the embodiment of the invention, as shown on FIG. 1, the syphon filtration system comprises; a filter unit 1, filter external piping and control valves 28, and a filter controller 41.

The filter unit 1 comprises; a filter vessel 2, filter media 3, a filter underdrain system 4, an outlet water internal pipe 5, a water level sensor and controller 6, an inlet water internal distribution pipe 14, and a backwash water collector trough 15.

The filter external piping and control valves 28 comprise; an inlet water pipe 12, an inlet water valve 13, an outlet water pipe 16, an outlet water control valve 17, an outlet water syphon pipe 18, an outlet water discharge pipe 19, a syphon control valve 20, a syphon vent pipe 21, a rinse water discharge pipe 22, a rinse water discharge control valve 23, a backwash water supply pipe 25, a backwash water supply control valve 26, a backwash water rate of flow control valve 27, a backwash water discharge pipe 29, and an air vacuum pump 30.

The filler controller 41 comprises indicating lights, switches, relays, and a PLC, and it is connected to the water level sensor and controller 6 and the control valves 17, 20, 23, and 26, and to an external command station to activate the filtration system production and idle operation cycles, with control wires 42.

The water level sensor and controller 6 provides inputs to the filter controller 41 on water levels 8 and 9 in the filter vessel 2.

The filter controller 41 controls open and closed status of the control valves 17, 20, 23 & 26 according to the water levels 8 & 9 in the filter vessel and a time logic program contained in the PLC for the filter media backwashing and rinse cycles and an external command for production or idle cycles.

The filter media 3 can be a single or multi-media composed of sand, anthracite, activated carbon or other proprietary media designed to remove specific suspended solids or dissolved impurities.

The filter underdrain system 4 can be made of sand and gravel, single or multilayer or constructed with a false bottom with slotted or perforated nozzles provided with metering tubes for air scour before the water backwashing.

The inlet water external pipe 12 is provided with an inlet water valve 13 which is a non-return valve, mounted horizontally, low hydraulic head open/close operation, full port design, equal to the cross section of the inlet water external pipe 12 preferably a swing type in a gravity inlet water supply system. The inlet water external pipe 12 is connected horizontally to the filter vessel 2 above the water level 7 and below the water level 8, and preferably not lower than one-third of the filter media depth above the filter media.

The backwash water collector trough 15 is a slotted or perforated pipe grid to uniformly collect the backwash water from the entire cross-section of the filter vessel 2.

The outlet water syphon pipe 18 is located above the filter media 3, preferably minimum 150 to 200 mm, to ensure a minimum water level 7 of 150 to 200 mm in the filter above the filter media 3 to ensure that the filter media are always fully submerged in water during the filter production and rinse cycles and not disturbed by the water falling of the internal distribution pipe 14.

The inlet water enters the filter through the inlet water external pipe 12, the non-return valve 13 and the internal distribution pipe 14, and it flows downward as indicated by an arrow 10. The inlet water passes through the filter media 3, the underdrain system 4, the outlet internal pipe grid 5, the external outlet pipe 16, the control valve 17, the syphon pipe 18 and the discharge pipe 19. The outlet internal pipe grid 5 is made of perforated or slotted pipes arranged such to evenly collect the filtered water during the filtration and rinsing cycles from the entire cross section of the filter and to evenly distribute the backwash water throughout the entire cross section of the filter during the backwash cycle with a preferred water velocity in the mind pipe and the pipes perforations/slots of approximately 1.0 m/s to 1.5 m/s.

The backwash water is provided through the backwash water supply pipe 25, the control valve 26 and the rate of flow control valve 27 into the pipe grid 5, and the underdrain system 4, the filter media 3, and it flows upward, as indicated by an arrow 11, into the backwash water collector trough 15, and the discharge pipe 29.

During the rinse cycle, the inlet water flows through the filter media 3 into the underdrain system 4 and the outlet pipes 5 and 16 and the rinse water discharge pipe 22 to the backwash water discharge pipe 29. The rinse water discharge pipe 22 is connected to the backwash water discharge pipe 29 at the same level as the outlet water syphon pipe 18 to prevent exposure of the filter media 3 during the rinse cycle as the hydraulic head loss through the filter media 3 during the rinse cycle is very low. The filter media rinse flow rate is the same as the filter production flow rate in a constant inlet water flow rate operation.

The filter operating cycles comprise a filtration cycle without syphon action, a filtration cycle with syphon action, a backwashing cycle, a rinsing cycle and an idle cycle.

During the filter operating cycles the control valve status is as follows:

Filtration cycle without syphon action or idle cycle:
  The control valve 17 is open.
  The control valve 20 is open.
  The control valve 23 is closed.
  The control valve 26 is closed.
Filtration cycle with syphon action:
  The control valve 17 is open.
  The control valve 20 is closed.
  The control valve 23 is closed.
  The control valve 26 is closed.
Backwashing cycle:
  The control valve 17 is closed.
  The control valve 20 is closed.
  The control valve 23 is closed.
  The control valve 26 is open.
Rinsing cycle:
  The control valve 17 is closed.
  The control valve 20 is open.
  The control valve 23 is open.
  The control valve 26 is closed.

The filtration with the syphon action is provided by the filter discharge pipes 16, 18 & 19 arrangement in an inverted 'U' shape and closure of the control valve 20. By opening of the control valve 20 the syphon action is lost and the filter operates without the syphon action.

The syphon action is activated by closing the control valve 20 when the water in the filter vessel 2 reaches the level 8. This operation is controlled by the water level sensor and controller 6 and the filter controller 41.

The syphon action causes the water level in the filter vessel 2 to drop initially, but the water level will rise again, after a certain time, as the filter media 3 are further plugged with the water impurities retained by the filter media.

When the water level in the filter vessel 2 reaches the level 9 the backwashing cycle is activated and it continues for a predetermined period of time, controlled by the filter controller 41.

The filter rinsing cycle follows immediately the backwashing cycle for a predetermined period of time, controlled by the filter controller 41.

After the rinsing cycle, the filter operation returns to the filtration cycle without the syphon action or to the idle cycle which has the same control valve position as the filtration cycle without syphon action.

During the filtration cycle with the syphon action air or other gas may be released from the water and it may accumulate in the filter syphon pipe 18. If this condition is detected the air vacuum pump 30 is activated to remove the air or other gas from the syphon pipe 18. This ensures an efficient action of the syphon piping system.

The rinse water discharge pipe 22 is connected to the backwash water discharge pipe 29 at the same level as the syphon pipe 18 elevation, to ensure that the water level in the filter vessel 2 does not drop below the low water level 7 during the filter rinsing cycle. This prevents the filter media 3 from being exposed and disturbed on the surface by the inlet water.

Figure 2:
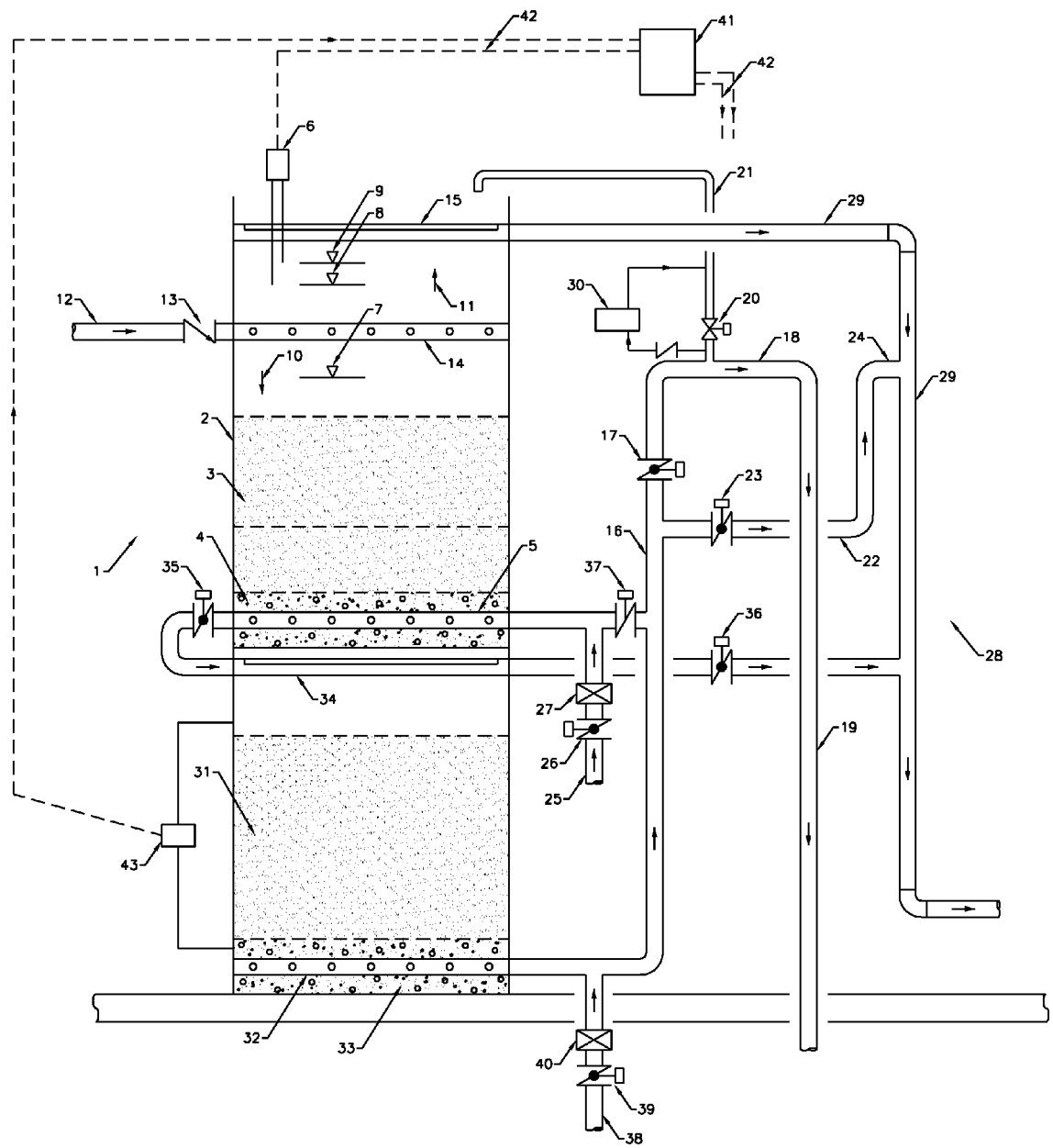
FIG. 2 is a diagrammatic illustration in vertical cross-section of the two-stage syphon filtration system.

A second embodiment of the invention is shown on FIG. 2.

For the various embodiments disclosed here, the same reference numeral numbers are used for the same or substantially similar features.

The filter vessel 2 is divided into upper and lower compartment by a solid horizontal plate/floor to accommodate first and second stage filtration and comprises two independent filter media 3 and 31, two independent underdrain systems 4 and 32, two independent water outlet pipes 5 and 33, two independent backwash water collecting troughs 15 and 34, and two independent backwash water supply pipes 25 & 38 and control valves 26 & 39 and rate of flow control valves 27 & 40.

The other additional features comprised in this embodiment are control valves 35, 36 & 37, and a differential pressure switch 43.

The filter operating cycles are the same in this embodiment as those outlined in the first embodiment and they comprise:
  Filtration without the syphon action or idle cycle.
  Filtration with the syphon action.
  Backwashing cycle.
  Rinsing cycle.

The filter backwashing can be performed jointly or independently for both filter media 3 and 31 followed by a joint or independent rinsing cycles of each filter media respectively.

If a joint filter backwashing and rinsing cycles are performed for both filter media 3 and 31, the filter media 3 backwashing and rinsing cycles can be extended beyond those performed for the filter media 31 as required.

The various combinations of the backwashing and rinsing cycles are outlined as follows:

Joint backwashing of both filter media 3 and 31:
    The control valves 35 & 39 are open, the backwash water supply is provided from pipe 38.
    The control valves 17, 20, 23, 36, 37 & 26 are closed.
    The backwash water flows upward through the filter media 31 and 3 to the backwash water collecting trough 15 and discharge pipe 29.

Joint rinsing of both filter media 3 & 31:
    The control valves 20, 23 & 35 are open.
    The control valves 17, 26, 36, 37 & 39 are closed.
    The rinse water flows downward through the filter media 3 and 31 to the discharge pipe 33 and the rinse water discharge pipe 22 and the backwash water discharge pipe 29.

Independent backwash and rinsing cycles of the filter media 3:
    Backwashing Cycle
    The control valve 26 is open.
    The control valves 17, 20, 23, 35, 36, 37 & 39 are closed.
    The backwash water supply is provided from the pipe 25 and the water flows upward through the filter media 3 to the backwash water collecting trough 15 and the backwash water discharge pipe 29.
    Rinsing Cycle
    The control valves 37, 23 & 20 are open.
    The control valves 17, 35, 36, 37 & 39 are closed.

Independent backwashing and rinsing cycles of the filter media 31:
    Backwashing Cycle
    The control valves 39 & 36 are open.
    The control valves 17, 20, 23, 26, 35 & 37 are closed.
    Rinsing Cycle
    The control valves 23, 35 & 20 are open.
    The control valves 17, 36, 37, 39 & 26 are closed.

The invention claimed is:

1. A syphon filtration system comprising:
   a filter unit,
   filter external piping and control valves,
   a filter controller;
     said filter unit comprises a filter vessel, filter media, an outlet water internal pipe, a water level sensor and controller, an inlet water internal distribution pipe, and a backwash water collector trough;
     said filter external piping and control valves comprise an inlet water pipe and inlet water valve, an outlet water pipe, an outlet water syphon pipe, an outlet water discharge pipe, a syphon vent pipe, a rinse water discharge pipe, a backwash water supply pipe, a backwash water discharge pipe, an air vacuum pump and an outlet water control valve, a syphon control valve, a rinse water discharge control valve, a backwash water supply control valve, a backwash water rate of flow control valve; and
     said filter controller is electrically connected to said control valves, said water level sensor and controller, and an external control station, wherein said filter controller receives input signals from said water level sensor and controller and said external control station to activate open/close said control valves to control said filtration system operation in different cycles of filtration both without syphon action wherein said outlet water control valve and syphon control valve are open, and said rinse water discharge control valve and backwash water supply control valve are closed, and with syphon action wherein said outlet water control valve is open, and said syphon control valve, rinse water discharge control valve and backwash water supply control valve are closed.

2. A syphon filtration system of claim 1 wherein said filter media is provided for a single stage filtration of inlet water in downward gravity flow, with a constant or varying flow rate, and is backwashed with air and/or water in upward flow direction with a constant or varying flow rate, and is rinsed in downward gravity flow with the inlet water with constant or varying flow rate.

3. A syphon filtration system of claim 1 wherein said outlet water internal pipe is provided under said filter media for collection and outlet of filtered inlet water, inlet and distribution of filter backwash supply water and collection and outlet of filter rinse water.

4. A syphon filtration system of claim 1 wherein said water level sensor and controller are mounted on the top of said filter vessel to detect at least two water levels in the upper part of said filter vessel; a lower water level to activate said syphon control valve and a higher water level to activate said filter media backwashing.

5. A syphon filtration system of claim 1 wherein said inlet water internal distribution pipe is horizontally connected to said filter vessel above said filter media and at or above said outlet water syphon pipe and below said backwash water collector trough, and below said lower water level detected by said water level sensor and controller.

6. A syphon filtration system of claim 1 wherein said backwash water collector trough slotted or perforated pipe grid to collect backwash water from the entire cross-section of said filter vessel and is located near the top of said filter vessel, and above said higher water level detected by said water level sensor and controller, and is fluidly connected to said backwash water discharge pipe.

7. A syphon filtration system of claim 1 wherein said inlet water pipe is horizontally connected to said filter vessel and fluidly connected to said inlet water internal distribution pipe.

8. A syphon filtration system of claim 1 wherein said inlet water valve is horizontally mounted on said inlet water pipe, outside said filter vessel, and is a low hydraulic head open/close operation one-way valve for admitting inlet water into said filter vessel through said inlet water internal distribution pipe and for preventing water outlet from said filter vessel through said inlet water internal distribution pipe.

9. A syphon filtration system of claim 1 wherein said outlet water pipe is fluidly connected with said outlet water internal pipe, said outlet water syphon pipe, said outlet water discharge pipe, said rinse water discharge pipe and said backwash water supply pipe, and said outlet water control valve.

10. A syphon filtration system of claim 1 wherein said syphon vent pipe is fluidly connected to said outlet water syphon pipe and said air vacuum pump, and said syphon control valve, and it extends to the top of said filter vessel, and is a small diameter in range of 12 to 75 mm.

11. A syphon filtration system of claim 1 wherein said rinse water discharge pipe is fluidly connected to said outlet water discharge pipe upstream of said outlet water control valve and to said backwash water discharge pipe at the same level as said outlet water syphon pipe to prevent exposure of said filter media during a rinsing cycle of said filter media.

12. A syphon filtration system of claim 1 wherein said backwash water supply pipe is fluidly connected to said outlet water pipe, said backwash water supply control valve and said backwash water rate of flow control valve, and to an external source of backwash water supply.

13. A syphon filtration system of claim 1 wherein said backwash water discharge pipe is fluidly connected to said backwash water collector trough and said rinse water discharge pipe and it discharges a backwash wastewater and a rinse wastewater to a wastewater collection or disposal system.

14. A syphon filtration system of claim 1 wherein said air vacuum pump is fluidly connected to said syphon vent pipe upstream and downstream of said syphon control valve and is provided for removal of air or a gas which may be present in the filtered water in said outlet water syphon pipe and said syphon vent pipe upstream of said syphon control valve.

15. A syphon filtration system of claim 1 wherein said different cycles of filtration further include:
   backwashing wherein said outlet water control valve, syphon control valve and rinse water discharge control valve are closed, and said backwash water supply control valve is open;
   rinsing wherein said outlet water control valve and backwash water supply control valve are closed, and said syphon control valve and rinse water discharge control valve are open; and
   idle cycle wherein said control valves are activated as for filtration without syphon action.

16. A syphon filtration system comprising:
   a filter unit,
   filter external piping and control valves,
   a filter controller;
      said filter unit comprises a filter vessel for two-stage filtration media, two-stage filtration media, an internal piping, a water level sensor and controller, and a differential pressure switch;
      said filter external piping comprises inlet water pipe and an inlet water valve, independent water outlet pipes and backwash water collector troughs, and backwash water supply pipes for each filter media, a common water outlet syphon pipe, a common water outlet discharge pipe, a common syphon vent pipe, a common air vacuum pump, a common rinse water discharge pipe, a common backwash water discharge pipe for both filter media, control valves and rate of flow control valves for each said backwash water supply pipes, a control valve for said common water outlet pipe, a control valve for said common syphon vent pipe, a control valve for said common rinse water discharge pipe;
      said filter controller is electrically connected with said water level sensor and controller, said differential/pressure switch, said control valves and an external command station to activate the filter system operating cycles for production without syphon action wherein said control valves for said common water outlet pipe and said syphon vent pipe are open, and said control valves for said rinse water discharge pipe and said backwash water supply pipes are closed, and production with syphon action wherein said control valve for said common water outlet pipe is open, and said control valves for said syphon vent pipe, said rinse water discharge pipe and said backwash water supply pipes are closed.

17. A syphon filtration system of claim 16 wherein said filter system operating cycles further include independent backwashing of each filter media, joint backwashing of both filter media, independent rinsing of each filter media, joint rinsing of both filter media and idle cycle with said control valve position the same as said production without syphon action cycle.

18. A syphon filtration system of claim 17 wherein said water level sensor activates said syphon control valve for said common syphon vent pipe and said backwash cycle for said first stage filtration media through said filter controller.

19. A syphon filtration system of claim 17 wherein said differential pressure switch activates said backwash cycle for said second stage filtration media through said filter controller.

* * * * *